United States Patent [19]

Cattaneo

[11] Patent Number: 4,516,480
[45] Date of Patent: May 14, 1985

[54] PISTON RING FOR ENDOTHERMIC MOTORS HAVING AN IMPROVED FLAME DAMPER RING

[76] Inventor: Leopoldo Cattaneo, Via de Allesandri, 1, 20144 Milano, Italy

[21] Appl. No.: 363,041

[22] Filed: Mar. 29, 1982

Related U.S. Application Data

[63] Continuation-in-part of Ser. No. 152,496, May 22, 1980, abandoned.

[30] Foreign Application Priority Data

Jun. 1, 1979 [IT] Italy ................. 23193 A/79
Jun. 1, 1979 [IT] Italy ................. 23194 A/79

[51] Int. Cl.³ ............... F02F 5/00; F16J 9/08; F16J 9/20
[52] U.S. Cl. ................... 92/182; 123/193 P; 277/174; 277/176; 277/223
[58] Field of Search .......... 92/182, 172, 208; 123/193 P, 193 CP; 277/173, 216, 223, 214, 224, 176, 174

[56] References Cited

U.S. PATENT DOCUMENTS

| | | | |
|---|---|---|---|
| 1,770,034 | 7/1930 | Hardy | 277/176 |
| 2,291,505 | 7/1942 | Phillips | 277/223 |
| 2,640,746 | 6/1953 | Phillips et al. | 277/223 X |
| 3,174,762 | 3/1965 | Hesling et al. | 277/193 |
| 3,489,130 | 1/1970 | Polidan et al. | 123/193 CP |

FOREIGN PATENT DOCUMENTS 95979  6/1939  Sweden ................. 277/223

Primary Examiner—Irwin C. Cohen
Attorney, Agent, or Firm—Steinberg & Raskin

[57] ABSTRACT

The piston has at least one first piston ring groove for receiving a first compression ring and a flame damper ring groove located above said first compression ring for receiving a floating type flame damper ring. According to the invention, on the outer surface of the flame damper ring there is provided a groove adapted to receive a second compression ring having tips defining a gap, the radial thickness of the second compression ring is lower than that of said first compression ring. The second compression ring is so conformed not to close on the tips when subjected to external pressure but to act with its inner surface on the bottom of its groove.

1 Claim, 2 Drawing Figures

PISTON RING FOR ENDOTHERMIC MOTORS HAVING AN IMPROVED FLAME DAMPER RING

RELATED APPLICATIONS

This application is a continuation-in-part of my copending application Ser. No. 152,496, filed May 22, 1980, now abandoned.

BACKGROUND OF THE INVENTION

This invention relates to a piston for endothermic motors having an improved floating flame damper ring.

Pistons provided with several types of flame dampers are already known, said flame dampers being constructed to protect the sides of the piston from the flame and pressure blows.

The known flame dampers are inserted into the piston head or provided as ring-shaped covers, are made with refractory ceramic inserted into the piston head or embedded into the piston casting or may also be hot pressed onto the same piston.

The drawbacks of said conventional flame dampers reside in that they expand together with the piston and they, therefore, require a considerable clearance and are further subjected to high stresses.

In order to avoid the above and other drawbacks, the U.S. Pat. No. 3,174,762 discloses a piston having a groove for seating a flame damper ring, of low thermal expansion coefficient, the inside diameter of the ring and the base diameter of the groove being such that clearance is maintained during normal operation of the engine, the flame damper ring being thus substantially floating within its groove.

SUMMARY OF THE INVENTION

The object of the present invention is to provide a piston for endothermic motors having a floating flame damper ring so constructed to improve the efficiency of the known floating type flame damper rings.

The piston for endothermic motors is of the type comprising at least one first piston groove for receiving a first compression ring and a flame damper ring groove located above said first piston ring for receiving a floating flame damper ring and is characterized in that at least one groove is provided on the outer surface of said floating flame damper ring for receiving a second compression ring having tips defining a gap.

According to a further characteristic of the invention, said second compression ring has a radial thickness lower than that of said first compression ring and is so constructed not to close on the tips when subjected to external pressure but to act with its inner surface on the bottom of its groove.

The flame damper ring can be advantageously made with low expansion ferrous alloys, ceramic materials and graphite-based sintered materials. Said materials can be chromium or molybdenum plated: due to the fact that the ring does not press against the cylinder—since the expansion coefficient of chromium and molybdenum is higher than that of the selected material with which the flame damper ring is made—the covering layer, when hot, always works under compression (higher expansion than that of the substrate) and does not crack also when the outer part of the ring cool off when in the lower portion of the cylinder.

In a practical embodiment, attention has to be made that, at a steady state of the engine, clearance be always left between the ring and the bottom of the groove so that no side thrust is exerted on the ring and that the material used be selected with such an expansion coefficient, variable from engine and engine, that the clearance between the hot flame damper ring and the cool cylinder at the bottom dead center of the flame damper ring be within the minimum limit which avoids the seizing.

The novel features which are considered as characteristic of the invention are set forth in particular in the appended claims. The improved piston, however, both as to its construction and its mode of operation, together with additional features and advantages, will be best understood upon perusal of the following description of a specific embodiment with reference to the accompanying drawing.

DESCRIPTION OF THE PREFERRED EMBODIMENT

Figure 1:
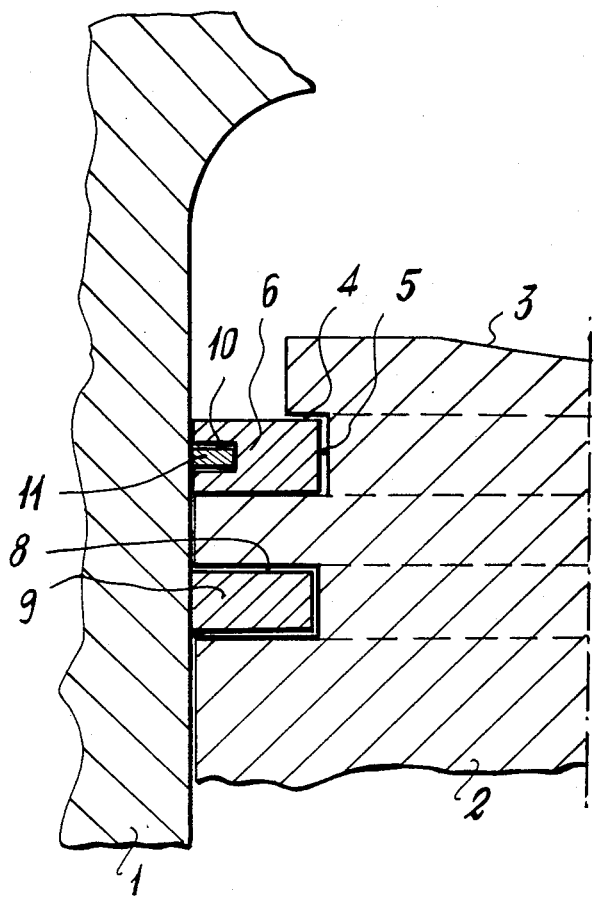
FIG. 1 is a diagrammatic section view of a solid type flame damper ring according to the invention mounted on a piston.

With reference to the figures, 1 designates a cylinder and 2 designates a piston.

Near the head 3 of piston 2 a circumferential groove 4 is provided and the upper bore of piston 2 is reduced so as to allows the seating into groove 4 of a solid or closed floating flame damper ring 6. This can be done by heating the ring 6 and cooling the piston 2. As clearly shown, between the ring 6 and the bottom of the groove 4 a clearance 5 is left.

Figure 2:
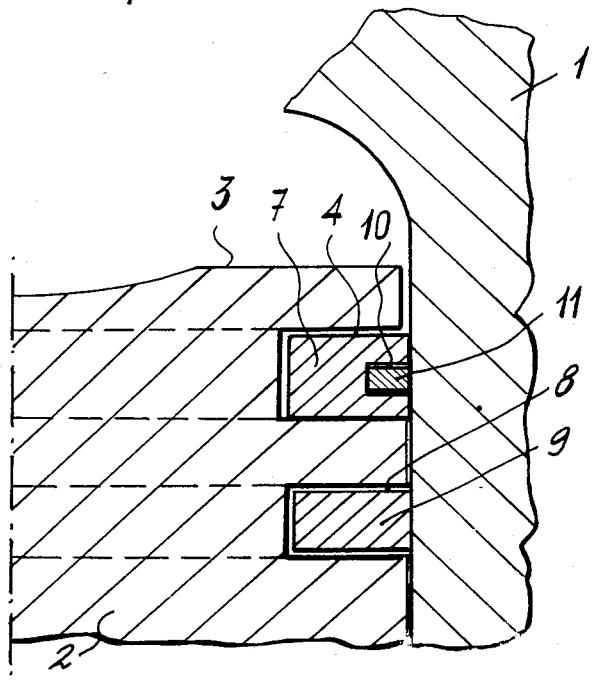
FIG. 2 is a diagrammatic sectional view of an open type flame damper ring according to the invention mounted on a piston.

In the embodiment shown in FIG. 2, the flame damper ring 7 is of the open type so that it can be seated into the groove 4 without need of reducing the diameter of the piston head.

On the piston 2, below the groove 4, there is conventionally provided at least one piston ring groove 8 for receiving a compression ring 9.

According to the invention, on the outer surface of the flame damper ring 6,7 there is provided at least one groove 10 for receiving a further compression ring 11 having tips (not shown) defining a gap and a thickness lower than that of the compression ring 9. The ring 11 is so constructed not to close on the tips but to act with its inner surface on the bottom of the relative groove 10 when subjected to external pressure.

What I claim is:

1. A piston for an endothermic motor, comprising
   at least one first piston ring groove for receiving a first compression ring,
   a flame damper ring groove disposed between said first groove and a head of said piston,
   a floating flame damper ring disposed with clearance in said flame damper ring groove,
   at least one second groove provided on an outer surface of said flame damper ring in a radial direction thereof, and
   a second compression ring of the split type having tips and disposed within said second groove to define a ring gap between said second compression ring and said flame damper ring in the radial direction thereof,
   said second compression ring so disposed as not to close on the tips thereof when subjected to external pressure, and so disposed as to act on a surface of said second groove in a radial direction thereof when subjected to external pressure.

* * * * *